United States Patent
Karadag et al.

(10) Patent No.: US 12,082,236 B2
(45) Date of Patent: Sep. 3, 2024

(54) METHOD OF QoS-CONSTRAINED SEMI-PERSISTENT SCHEDULING OF MACHINE TYPE COMMUNICATIONS IN CELLULAR NETWORKS

(71) Applicant: KOC UNIVERSITESI, Istanbul (TR)

(72) Inventors: Goksu Karadag, Istanbul (TR); Sinem Coleri Ergen, Istanbul (TR); Yalcin Sadi, Istanbul (TR); Recep Gul, Zurich (CH)

(73) Assignee: KOC UNIVERSITESI, Istanbul (TR)

( * ) Notice: Subject to any disclaimer, the term of this patent is extended or adjusted under 35 U.S.C. 154(b) by 442 days.

(21) Appl. No.: 17/430,339

(22) PCT Filed: Feb. 12, 2019

(86) PCT No.: PCT/TR2019/050088
§ 371 (c)(1),
(2) Date: Aug. 12, 2021

(87) PCT Pub. No.: WO2020/167261
PCT Pub. Date: Aug. 20, 2020

(65) Prior Publication Data
US 2022/0132520 A1    Apr. 28, 2022

(51) Int. Cl.
*H04W 72/543* (2023.01)
*H04W 4/70* (2018.01)
(Continued)

(52) U.S. Cl.
CPC .......... *H04W 72/543* (2023.01); *H04W 4/70* (2018.02); *H04W 72/0453* (2013.01); *H04W 72/56* (2023.01)

(58) Field of Classification Search
CPC . H04W 72/543; H04W 4/70; H04W 72/0453; H04W 72/56
See application file for complete search history.

(56) References Cited

U.S. PATENT DOCUMENTS

| | | | |
|---|---|---|---|
| 9,326,290 B2 | 4/2016 | Zhu et al. | |
| 2012/0106552 A1* | 5/2012 | Iwao | H04L 45/54 370/392 |

(Continued)

FOREIGN PATENT DOCUMENTS

| | | |
|---|---|---|
| CN | 106507494 A | 3/2017 |
| CN | 107124693 A | 9/2017 |

(Continued)

OTHER PUBLICATIONS

Mukesh Kumar Giluka, et al., Class Based Dynamic Priority Scheduling for Uplink to Support M2M Communications in LTE, 2014, pp. 313-317.

*Primary Examiner* — Nizam U Ahmed
(74) *Attorney, Agent, or Firm* — Bayramoglu Law Offices LLC

(57) ABSTRACT

A semi-persistent scheduling method of machine-type communications specifically for cellular devices and a system employing the semi-persistent scheduling method are provided. Three algorithmic methods act in cooperation with allocating smartest and fastest possible incarnations of a resource handling in a cellular network setting, exploiting an inherent periodicity of a machine-to-machine communication taking place; a high priority cluster takes precedence over another cluster, before assigned to Unit Frequency Bands (UFB) with a given width, any device with a set priority according to a quality-of-service requirement allocation of the any device is executed on the UFB.

19 Claims, 4 Drawing Sheets

(51) Int. Cl.
*H04W 72/0453* (2023.01)
*H04W 72/56* (2023.01)

(56) References Cited

U.S. PATENT DOCUMENTS

| | | |
|---|---|---|
| 2013/0286918 A1 | 10/2013 | Park et al. |
| 2016/0113025 A1 | 4/2016 | Shaw et al. |
| 2018/0007665 A1 | 1/2018 | Goto et al. |
| 2018/0183684 A1 | 6/2018 | Jacobson et al. |
| 2019/0200333 A1* | 6/2019 | Pajukoski ............. H04L 5/0007 |
| 2019/0235763 A1* | 8/2019 | Gudipati ............... G06F 3/0659 |
| 2021/0037505 A1* | 2/2021 | Kim ...................... H04L 1/0002 |

FOREIGN PATENT DOCUMENTS

| | | |
|---|---|---|
| CN | 108650662 A | 10/2018 |
| WO | 2017015528 A1 | 1/2017 |
| WO | 2017166260 A1 | 10/2017 |

* cited by examiner

METHOD OF QoS-CONSTRAINED SEMI-PERSISTENT SCHEDULING OF MACHINE TYPE COMMUNICATIONS IN CELLULAR NETWORKS

CROSS REFERENCE TO THE RELATED APPLICATIONS

This application is the national stage entry of International Application No. PCT/TR2019/050088, filed on Feb. 12, 2019, the entire contents of which are incorporated herein by reference.

TECHNICAL FIELD

The invention presented hereby generally concerns scheduling of machine type communications (MTC), specifically machine-to-machine (M2M) communications in a cellular network setting, in the context of quality of service (QoS) regarding devices with limited radio resources for efficient allocation thereof. Disclosed invention also falls within the technical realm of LTE and post-LTE (5G) networks, effective management of said network resources having been based on the principle of serving as many devices as possible with the frequency resources available.

BACKGROUND

Machine-to-machine (M2M) communication refers to autonomous communication between a large group of devices and/or machines, within a trend marked by a tendency to grow increasingly and is expected to generate a huge amount of additional data traffic and new revenue streams, embodying great significance for key areas of human economic endeavor such as the smart grid, networked homes, healthcare and transportation. One of the major challenges posed within machine-to-machine (M2M) communication paradigm is the capability to scale to a larger number of connected devices and to provide ultra-low delay communications in order to meet coveted requirements for Internet of Things (IoT). M2M applications mostly require seamless coverage over a large area to facilitate the communication of M2M devices and M2M servers in different network domains. Almost all existing M2M applications are based on GPRS, however, limited capacity of GPRS cannot support large number of M2M devices expected to be deployed in the near future. Moreover, dedicated M2M cellular architectures can only support very low throughput. Thus, exploiting existing LTE infrastructure and providing a native support in 5G for fast growing M2M services are of paramount importance.

The first consideration regarding M2M devices is efficiency in communication. M2M devices generate small amount of data, and to maintain high efficiency, signaling overhead should be kept small as well by exploiting the periodicity of M2M communications. The second issue is the severe congestion caused by significantly large number of M2M devices within a cell trying to access the channel within a short period of time. Another problem to tackle stems from the scarcity of the spectrum. Sustaining acceptable QoS with these scarce resources requires efficient utilization of the available spectrum resources. Furthermore, many M2M and H2H applications have strict timing requirements, and giving priority to one and not to the other may cause excessive delays, resource starvation and performance degradation. Therefore, the frequency bands reserved for M2M and H2H devices need to be separated for fair allocation of resources. Also, there must be sufficient radio resources immediately available for delay-sensitive unscheduled devices. To address these issues regarding spectrum scarcity, the number of frequency bands allocated to M2M devices must be minimized to serve more M2M devices and provide more resources for H2H communications.

Patent number US 2016113025 discloses a teaching regarding a solution to the problem of network congestion due to machine-to-machine (M2M) traffic via QoS based latency tolerance at the home subscriber server. This is achieved by allocation of a QoS parameter through correlation of a machine identity. Said identity is found in a message request being received, which is in turn assigned a priority selected between one priority and at least one other lower priority.

Patent number US 2018183684 discloses methods, systems, and apparatus, including computer programs encoded on a computer storage medium, for prioritizing network traffic. The method includes collecting, for local networks, traffic data representing communication traffic over the local network for a period of time; determining, for each of the network devices included in the networks, a device type of the network device and at least one device priority value for the network device; training a device prioritization model, using the traffic data and the device priority values of the devices, receiving, by the device prioritization model, for a local network, a list of network devices that are included in the local network; and generating, by the device prioritization model, a prioritization scheme for the local network that prioritizes device traffic among the network devices based on the device types and device priority values of the network devices.

The teaching contained within WO 2017166260 relates to an improved semi-persistent resource allocation for a mobile terminal (MT) for transmitting periodic data. The MT transmits information on the periodic data to the radio base station (BS), such that the BS determines the different possible transmission periodicities and/or the different possible message sizes of the data components of the periodic data. The MT receives from the BS plural semi-persistent resource configurations, each being usable to transmit at least one of the supported data components. The MT indicates to the BS the data components that are to be transmitted by the MT. The MT receives from the BS an activation command to activate one or more of the SPS configurations to periodically allocate radio resources for the MT to transmit each of the indicated data components. The MT then transmits the one or more data components based on the radio resources and the transmission periodicity as configured by the activated one or more SPS configurations.

Within the scope of document with publication number WO 2017015528 methods, systems, and devices for wireless communication are described, where semi-persistent scheduling (SPS) utilization for communication with various wireless communication devices, including machine-type communication (MTC) devices, to reduce overhead on control channels is taught. Data transmissions scheduling using SPS techniques may be repeated and bundled together to effect coverage enhancement (CE) for devices with poor radio quality conditions. SPS communication may be used in both uplink and downlink transmissions. An SPS configuration may include a predefined number of scheduled transmission periods and a CE level, which may be established in either an SPS configuration message or as part of the SPS activation message from a base station. A device may identify the CE level of the transmissions and, in some cases, may determine the periodicity of the SPS based on the CE level. Bundled transmissions assigned with SPS may be prioritized with respect to one another or dynamically assigned resources.

Patent document with publication number U.S. Pat. No. 9,326,290 discloses a resource scheduling method which comprises: configuring a set of predefined semi-persistent scheduling parameters for a user equipment (UE) when the cell of the UE is determined to be an interference limited cell and a semi-persistent scheduling mechanism needs to be set for the UE; allocating semi-persistent scheduling resources to the UE for transmitting service data according to the semi-persistent scheduling parameters when the UE is determined to be in need of a semi-persistent scheduling mechanism for transmitting the service data of access services; sending the resource scheduling information of the semi-persistent scheduling resources to the UE over the downlink control channel of the UE.

Primary object of the disclosed invention is to present a method of semi-persistent scheduling (SPS) scheme to make efficient use of the available resources.

Another object of the disclosed invention is to present a method of semi-persistent scheduling (SPS) scheme to make efficient use of available resources with the aim of achieving fair allocation.

Another object of the disclosed invention is to present a method of semi-persistent scheduling (SPS) scheme conforming to the given QoS standards.

Another object of the disclosed invention is to present a semi-persistent scheduling (SPS) method and system for M2M transmissions based on the exploitation of their periodicity, reducing the overhead of the signaling required for connection initiation and scheduling.

Yet another object of the disclosed invention is to present a method and a system wherein effective management the admission of new devices to the network with a call admission mechanism, wherein serving as many devices as possible is prioritized.

SUMMARY

In proposed invention, primary focus of which is data conveyance among machines within cellular networks and traffic existent whereby, namely machine-to-machine (M2M) communication(s), a framework for optimally efficient resource handling is taught in form of a method and a system utilizing said method. Said framework offers a robust, efficient and convergent solution in organizing network resources compliant with quality-of-service (QoS) requirements dictated thereupon. In a preferred embodiment of the system employing the method taught in disclosed invention; the base station uses semi-persistent scheduling (SPS) to allocate resources to time-triggered machine type devices whose data generations are pre-known, and dynamic scheduling to include event-based machine-to-machine devices. Handling of the newly-arriving devices is processed through a call admission algorithm, including both existing and newly arriving devices and excluding departing devices from a common pool of machines. The schedule is periodically updated depending on various factors such as traffic density and bandwidth usage. If these devices cannot be allocated within the available frequency resources, then the lowest priority devices are dropped.

Said algorithmic multiplicity, aside from the third aspect in the form of a search algorithm, displays a polynomial time complexity, and because of aforementioned robustness in a highly dynamic environment with everchanging traffic load and behavior, a characteristic of M2M-handling cellular networks, it stands out with flexibility compared to other cluster-centered M2M grouping and assignment solutions known in the art.

First of the threefold algorithmical approach as proposed in the disclosed invention is a delay tolerance based quality-of-service (QoS) representation scheme that, for each device in the network, time and frequency resource elements for data transmission are discretized by width, and assigned according to delay tolerance of each M2M device. In this, delay tolerance is related to the inherent periodicity of the packets arriving to the base station by way of which device resource priorities are matched with QoS requirements pertaining thereto. Second algorithm working in cooperation with the first as yet another building block of the solution at hand is a call admission mechanism, concerns admission and resource allocation of time-triggered M2M devices newly joining the network in question is scheduled with the goal of using minimum number of unit frequency bands while still complying with QoS guarantees thereof. It is useful to note here that all firsthand allocation is executed with respect to a certain occupied band at hand, on the occasion the cooperation between said two algorithms fails to assign all newly arriving devices within already occupied band(s); first algorithm handles their allocation on new bands.

Third aspect of the method in the disclosed invention is an optimal solution determining sub-method responsible for the overall computational inexpensiveness. In this regard, every node which in turn descends from a parent node (representing a band for device allocation) comprising devices enumerated in decreasing priorities are checked whether if they satisfy two conditions for the allocation of a given device on the particular band, namely whether if the allocation of the device on the particular band that the node represents violates the delay bound for the device, and whether if the allocation of the device on the particular band that the node represents results in a worse solution than the best feasible solution already obtained. Both conditions are checked without altering the allocation state of devices in the case of the parent node, ensuring the delay bound violation and best solution intrusion are irreversible in descendant nodes, facilitating the elimination of solutions that are worsening in efficiency while reducing complexity. Two variables are updated in every iteration, one storing the best feasible solution and the other storing band allocation corresponding to the former, together presenting the output of an essentially pruning based depth-first search marked by a definitive convergence to the optimal outcome of resource allocation with uncompromised QoS.

BRIEF DESCRIPTION OF THE DRAWINGS

Accompanying figures are given solely for the purpose of exemplifying a semi-persistent scheduling method for machine-to-machine (M2M) communications and a system employing the same method, whose advantages over prior art were outlined above and will be explained in brief hereinafter.

The figures are not meant to delimit the scope of protection as identified in the claims nor should they be referred to alone in an effort to interpret the scope identified in said claims without recourse to the technical disclosure in the description of the present invention.

DETAILED DESCRIPTION OF THE EMBODIMENTS

Figure 1:
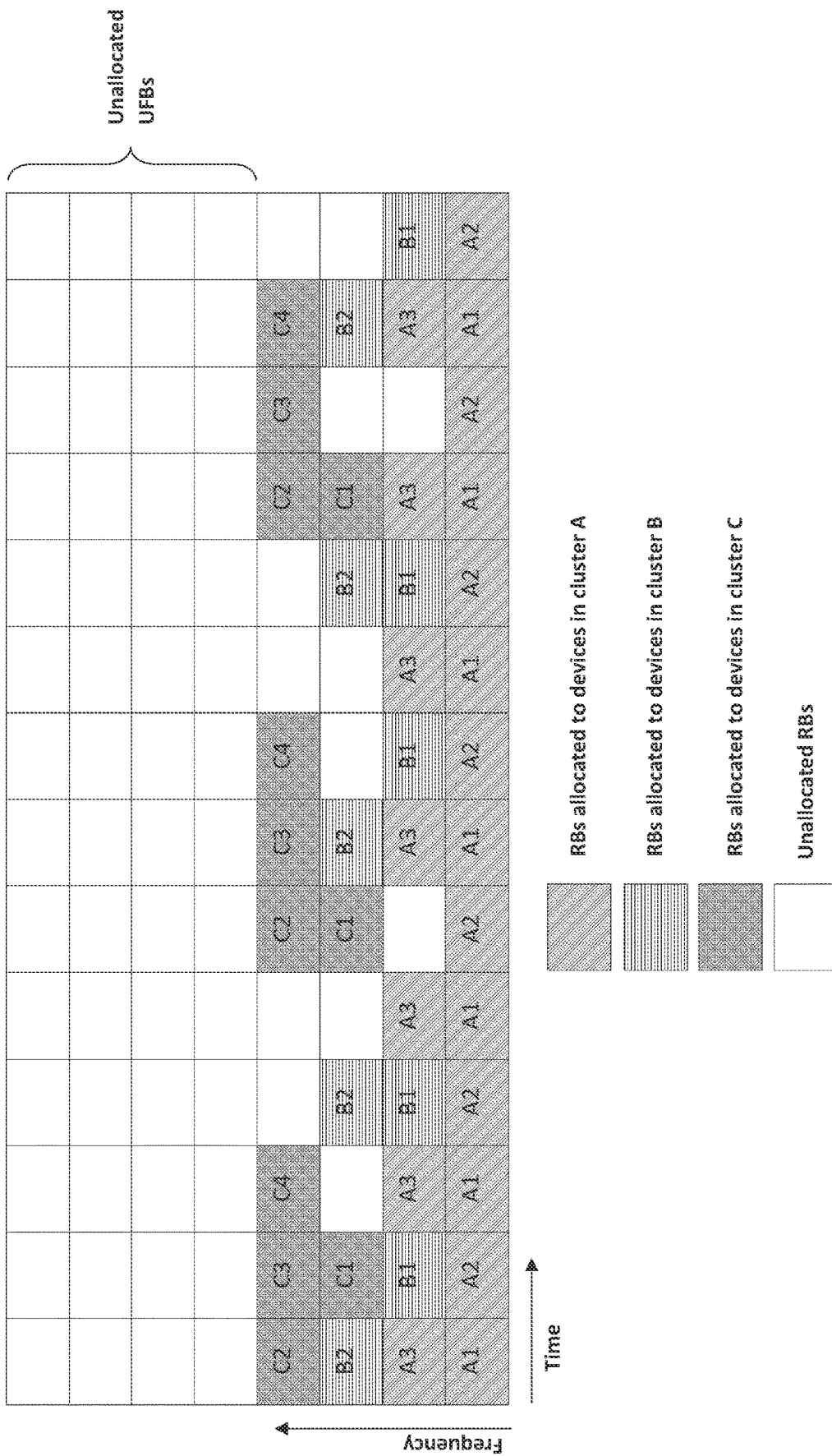
FIG. 1 demonstrates a visualization of the operation of Minimum Frequency First Fit Allocation (MFFFA) algorithm according to the disclosed invention.
Figure 2:
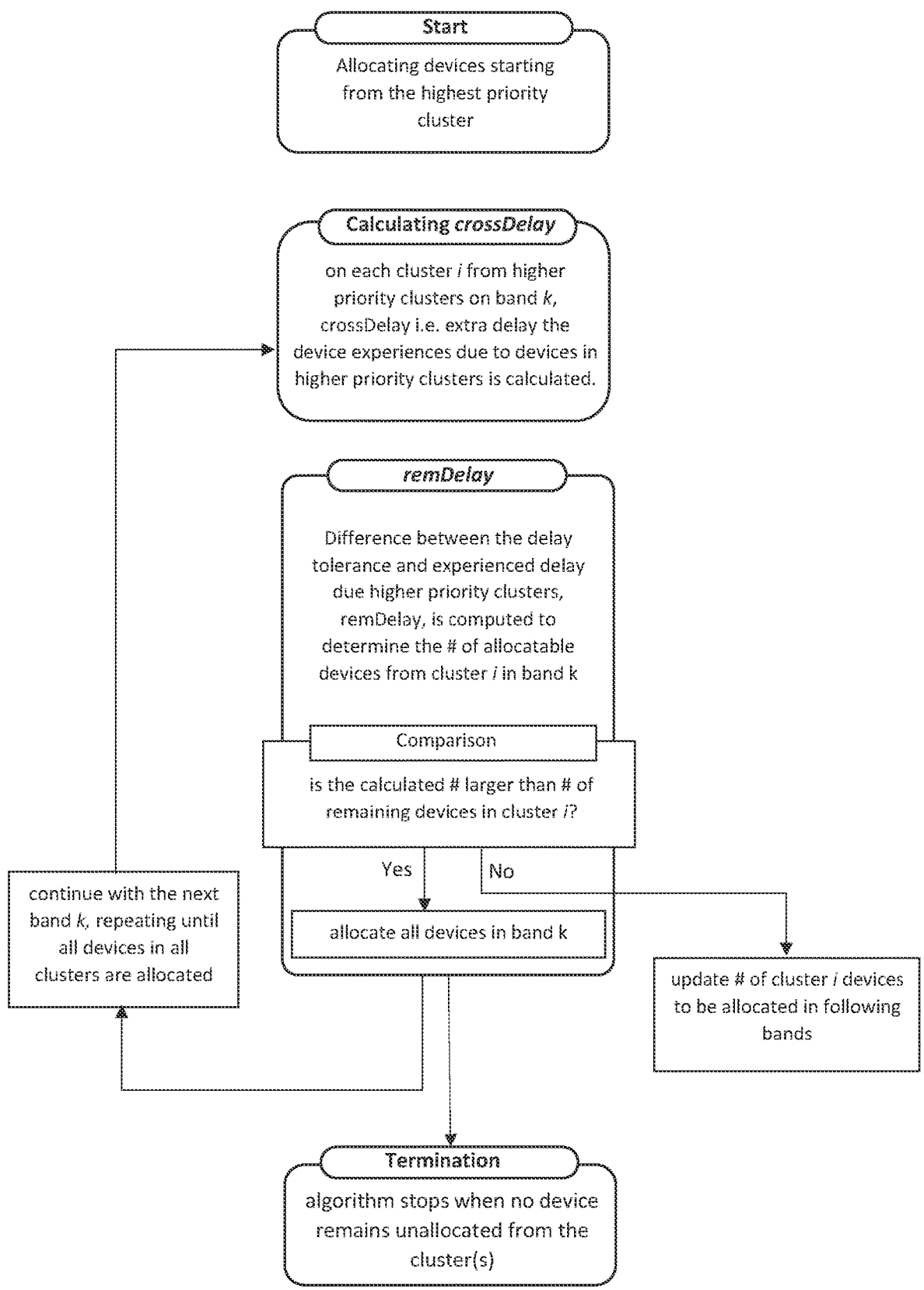
FIG. 2 demonstrates the flow diagram of Minimum Frequency First Fit Allocation (MFFFA) algorithm according to the disclosed invention.
Figure 3:
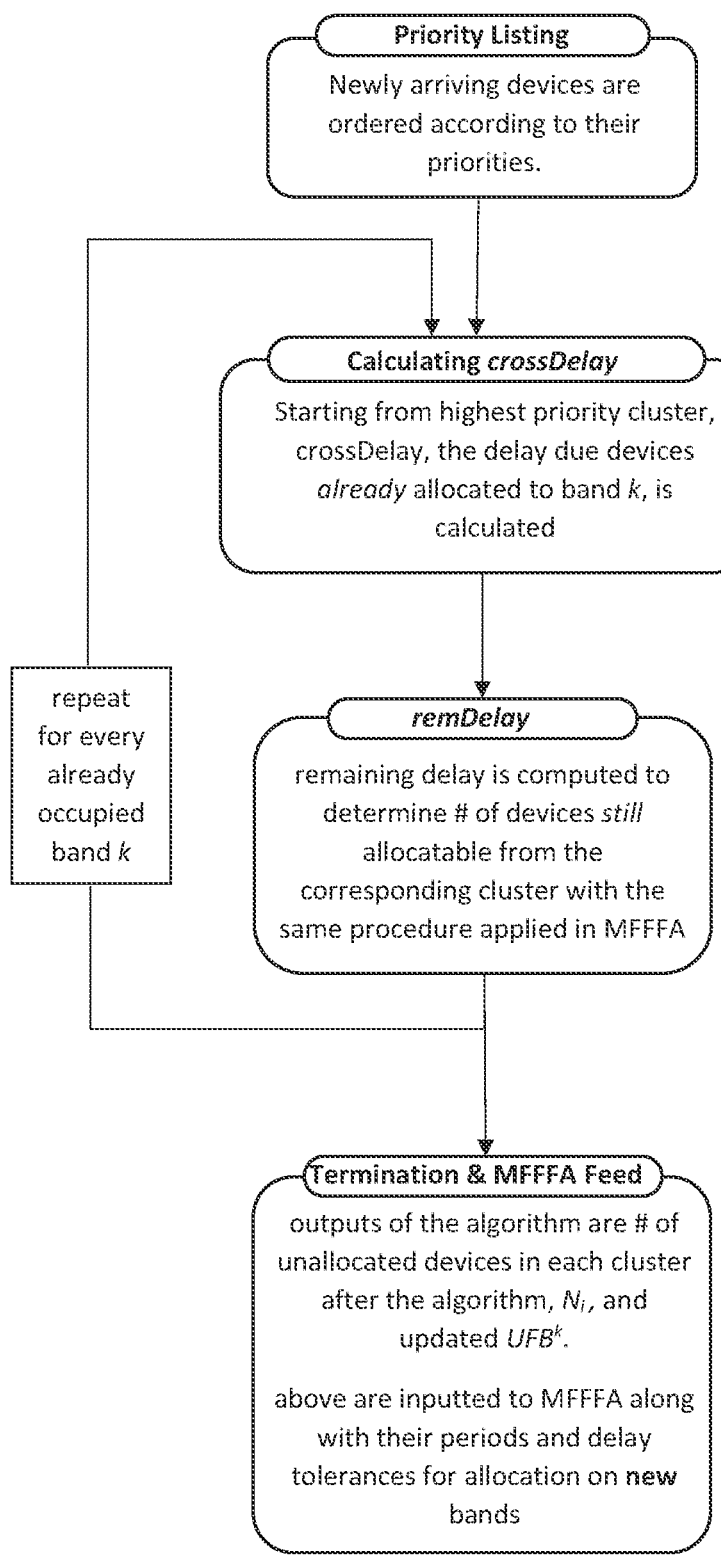
FIG. 3 demonstrates the flow diagram of First Fit Occupied Bands (FFOB) algorithm according to the disclosed invention.
Figure 4:
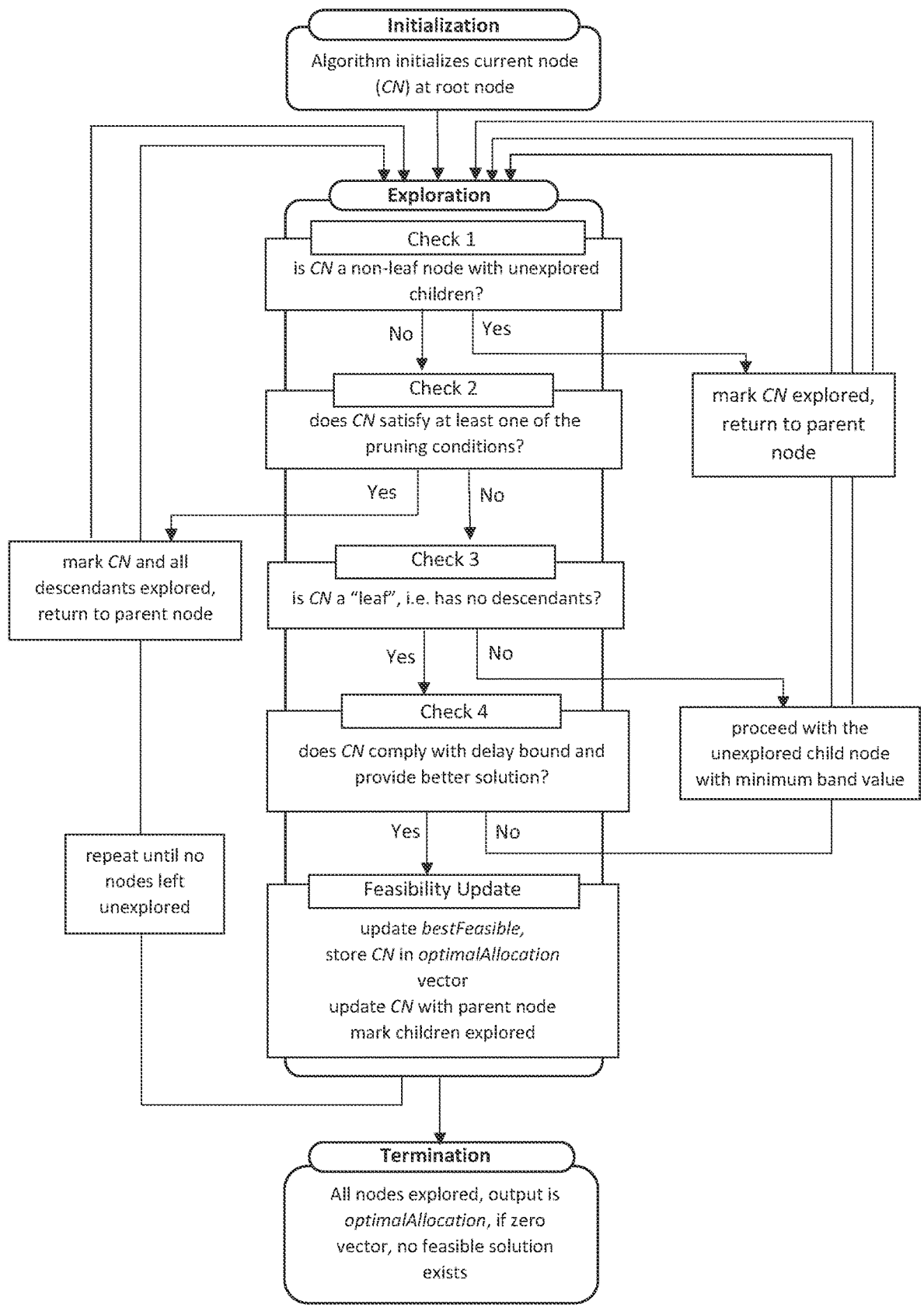
FIG. 4 demonstrates the flow diagram of Efficient Depth-First Search (EDFS) algorithm according to the disclosed invention.

The present invention discloses a method and a system employing the same method for machine-to-machine (M2M) communications, specifically one within the context of LTE and 5G-based incarnations thereof with the goal of ensuring minimization of the frequency band usage for fair and efficient allocation of time and frequency resource elements (referred to as resource blocks), as well as reduction of the signaling overhead for connection initiation/scheduling and admission of new devices into the network to serve the maximum amount of devices/machines as possible. Such a method and system are devised based on exploitation of fundamental and intrinsic properties of data generated and transmitted by machines as end devices i.e. essential periodicity of transmission for aspects such as voice in LTE (VoLTE), whereupon an algorithmic plurality is built. The method in the invention is designed to satisfy various quality-of-service (QoS) requirements such as stringent timing constraints on data generation and transmission. Furthermore, it is semi-persistent, which constitutes adopting dynamic scheduling features for retransmission of data, unlike persistent scheduling which preallocates resources for retransmissions.

Over and above, disclosed method banks on a computationally inexpensive algorithm with polynomial-time complexity in addition to having a theoretically highlighted worst-case approximation bound on the frequency resources used for certain quality-of-service (QoS) requirements, such as devices with implicit delays and devices that are simply periodic based on the common assumption that they generate data at integer multiples of one resource block. Disclosed method also incorporates a call admission mechanism to manage the admission and resource allocation of newly joining machine-to-machine (M2M) devices to provide robustness in a dynamic environment with constantly changing traffic load and characteristics. Thus, LTE-based machine type communications handled through various ends are surpassed in that the three-level algorithm structure proposed in the disclosed invention in both flexibility and computational lightness.

The general scheduling framework in the disclosed invention can be summarized as follows: The base station uses semi-persistent scheduling (SPS) to allocate resources to time-triggered machine-to-machine (M2M) devices, whose data generations are known beforehand; and uses dynamic scheduling to include event-based machine-to-machine (M2M) devices. For the newly arriving devices, a call admission algorithm is executed, including both existing and newly arriving devices and excluding departing devices. The schedule is updated periodically depending on various factors such as traffic density and bandwidth usage. If these devices cannot be allocated within the available frequency resources, then the lowest priority devices are dropped.

In machine-to-machine (M2M) communication method and system according to the disclosed invention, resource allocation mechanisms are handled over concepts as fundamental elements of algorithmic approach as proposed. One such concept is resource blocks (RBs), which each device is allocated, denoting time-frequency resource elements to transmit data. Another specific concept in the framework of the disclosed invention is the Unit Frequency Band (UFB), defined as the frequency band pertaining to a width of 1 resource block (RB). The quality of service (QoS) requirement of machine type communication devices is represented by a maximum allowable delay, i.e., delay tolerance. Yet another concept is clusters, within which devices purported to have similar QoS characteristics are grouped. M2M devices have packet arrival periods and have priorities assigned thereto in a manner that is inversely proportional to said packet arrival periods, i.e., lower period implies a higher priority as devices with lower period also have lower delay tolerance. The solution is aimed at effectively minimizing the number of UFBs used for M2M communication while satisfying the quality-of-service requirements of all M2M devices.

Algorithmically threefold solution as offered in the disclosed invention begins with one algorithm, namely the Minimum Frequency First-Fit Allocation (MFFFA) Algorithm accounts for the allocation of devices between varying priority clusters, beginning with the highest priority associated therewith. For detailed explanation of said algorithm, following notation applies:

M: number of clusters $p_i^c$: packet arrival period for cluster i $d_i^c$: maximum allowable delay for cluster i $\tau_i^c$: transmission time of cluster i $N_i$: number of unallocated devices from cluster i $UFB_i^k$: $i^{th}$ entry of M-dimensional vector, storing the number of devices from cluster i in band k. The number of devices in cluster i that can be allocated to band k is given by $UFB_j^k * \min(N_i, \lfloor remDelay/\tau_i^c \rfloor)$.

crossDelay: the extra delay the device experiences due to devices in higher priority clusters. crossDelay that cluster i experiences from a higher priority cluster j on band k is given by $UFB_j^k * \lceil p_i^c/p_j^c \rceil * \tau_j^c$.

Minimum Frequency First Fit Allocation (MFFFA) algorithm operates in device clusters of differing priority themselves individually consisting of at least one device employing machine-to-machine communications, but generally include greater numbers of devices. The algorithm commences operation with allocating the devices starting from the highest priority cluster. As a next step, the value "crossDelay" on each cluster with subscript i from higher priority clusters is calculated. Treading forward, the difference between the delay tolerance and experienced delay due to higher priority clusters, denoted by "remDelay", is computed to determine the number of devices from cluster i that can be allocated in band k. If the calculated number is larger than the number of remaining devices from cluster i, then all remaining devices in cluster i are allocated to band k. Otherwise, the number of remaining devices from cluster i will be updated for the allocation to the following bands. The algorithm stops when there are no remaining allocated devices from the clusters.

Referring to FIG. 1, where the performance and working principle of MFFFA algorithm is exemplified; a frequency-time relationship is demonstrated in a Cartesian manner for the sake of representability. Let the number of clusters be 3. The cluster parameters are given by $d_1^c=2$, $p_1^c=2$, $\tau_1^c=1$, $N_1=3$, $d_2^c=3$, $p_2^c=3$, $\tau_2^c=1$, $N_2=2$, $d_3^c=3$, $p_3^c=6$, $\tau_3^c=1$, $N_3=4$. The first, second and third clusters are denoted by A, B and C, respectively. The algorithm commences with allocating devices from cluster A. Since there is no higher priority cluster, there is no delay imposed by any other cluster on A, hence crossDelay is set to 0.

The remDelay calculation, therefore, becomes $d_1$—crossDelay 2−0=2. The algorithm can allocate a total of remDelay/$\tau_1$=2/1=2 devices from cluster A on the first UFB, updating $UFB_1^1$=2. Next, cluster B is tried on the first UFB. The delay imposed on cluster B from cluster A on the first band is, $UFB_1^1 * \lceil p_2/p_1 \rceil * \tau_1 = 2 * \lceil 3/2 \rceil * 1 = 4$. However, 4=$d_2$=3, i.e. the delay imposed on cluster B is larger than its tolerance. Thus, the algorithm cannot allocate any new device from cluster B on the first UFB. Similarly, the delay imposed by cluster A on cluster C is $2 * \lceil 3/2 \rceil * 1 = 6$ and 6>$d_3$=3. Thus, no devices from cluster C can be allocated on the first band.

Following the allocation of the initial unit frequency band, the algorithm moves to the second UFB. At this point, the third device from cluster A is still unallocated. This device is allocated on the second UFB. The algorithm then proceeds to cluster B, the cluster with second highest priority. The crossDelay is calculated as $\lceil 3/2 \rceil * 1$. The remaining delay is $d_2$−crossDelay=3−2=1. The algorithm allocates remDelay/$\tau_2$=1/1=1 device from cluster B on the second band. For cluster C, the devices on the second UFB would impose $\lceil 6/2 \rceil + \lceil 6/3 \rceil = 5 > d_3$ delay, thus cluster C cannot be allocated on the second UFB. With this procedure, the remaining devices are allocated on the third and the fourth UFBs.

Aside from Minimum Frequency First Fit Allocation (MFFFA) algorithm a call admission mechanism is undertaken by, First Fit Occupied Bands (FFOB) Algorithm, which aims to manage the admission and resource allocation of newly joining time-triggered machine-to-machine (M2M) devices. Given the allocation of the existing devices, the newly arriving M2M devices are scheduled with the goal of using the minimum number of UFBs while providing their quality-of-service (QoS) requirements. FFOB is, in a level similar to MFFFA, except its execution on the UFBs some parts of which are already assigned to previously arrived devices.

MFFFA and FFOB algorithms, while both standalone applications, are With respect to their priorities, the newly arriving devices are allocated to the lowest indexed UFB on which they can be allocated, all the while satisfying their delay tolerance requirement(s). If all newly arriving devices cannot be allocated within already occupied bands, FFOB leaves them to the MFFFA for their allocation on new bands.

A set of terms are to be introduced for the sake of better elaboration of the method at hand, where we let the delay tolerance, period, transmission time and number of newly arriving devices, denoted by $d_i^c$, $p_i^c$, $\tau_i^c$, $N_i$, respectively, for i∈[1, M], be given. Let $UFB^k$ be an M-dimensional vector, with the it entry, denoted by $UFB_i^k$ storing the number of devices from cluster i in band k. $UFB_i^k$ is the input containing the number of devices from cluster i that are already allocated on band k.

Operation of said First Fit Occupied Bands (FFOB) algorithm as a sub-method can be elaborated as follows: Initially, newly arriving devices are ordered according to their priorities. Next, starting from the highest priority cluster, crossDelay, the delay experienced due to devices that are already allocated to band k, is calculated. Note that unlike MFFFA, devices experience an additional delay from all devices that are already assigned. The remaining delay is computed to determine the number of devices that can be additionally allocated from the corresponding cluster with the same procedure, previously applied in MFFFA. Consequently, the outputs of the FFOB algorithm are the number of unallocated devices after running the algorithm, $N_i$, and updated $UFB^k$. These outputs are given as inputs to MFFFA along with their periods and delay tolerances to be allocated on new bands.

Next to the FFOB algorithm, a particularly optimal solution which decreases the complexity of total enumeration is introduced. It is an efficient, pruning-based search algorithm based on the construction of a tree and development of pruning conditions to fathom the branches of the tree. Each node is represented by $z_r = (i_1, i_1, \ldots, i_N)$, where N is the number of total devices and the devices are enumerated in the order of decreasing priority. In the $j^{th}$ level of the tree, each of the nodes in the previous level is branched into $k_{max}$ nodes, representing the allocation of the $j^{th}$ node to the corresponding frequency band, where $k_{max}$ is the maximum number of available UFBs. The leaves of the tree represent the assignment of the nodes to the frequency bands. The optimal solution is based on depth-first search and pruning of the nodes during the construction without checking their descendants under the following conditions:

The allocation of the device on the particular band that the node represents violates the delay bound for the device; and, The allocation of the device on the particular band that the node represents results in a worse solution than the best feasible solution already obtained.

For both conditions, it is important to note that descendant nodes do not change the allocation of devices represented by the parent node. Therefore, if the delay bound is violated for a device on a particular band or if the allocation of the device requires more bands than the best solution apparent so far, these situations cannot be reverted on the descendant nodes. With this observation, solutions that are far from optimal are discarded.

The optimal solution finder, called Efficient Depth-First Search (EDFS) Algorithm is described next, and following notation applies:
  CN: current node
  bestFeasible: the best feasible solution corresponding to optimal solution
  optimalAllocation: the band allocation vector corresponding to optimal solution The part of the disclosed invention specifically designed to determine the optimal solution, namely the Efficient Depth-First Search (EDFS) algorithm initializes the current node (CN) from the root node. If the current node, CN, does not have any unexplored children (sub-nodes) and is not at level N, i.e. it is not one of the leaves of the tree, then CN is marked as explored, returning to parent node. However, if CN has children to be explored but satisfies at least one of the two pruning conditions stated above, then CN and all its descendants are marked explored, returning to parent node.

If current node, CN, has children to be explored but satisfies neither of the pruning conditions, then the algorithm proceeds with the unexplored child node with minimum band value. If the current node is at level N and provides a better feasible solution than bestFeasible, bestFeasible is updated while storing CN in the optimalAllocation vector. Since from each parent node, the algorithm moves to the unexplored child node with the minimum band value, all other unexplored nodes of the same parent are guaranteed to provide a worse solution when compared to bestFeasible. Thus, CN is updated with the parent node, while marking the parent and all unexplored children explored, and moving to the next parent node again. The algorithm terminates when all nodes are explored. The output is optima/Allocation. If optima/Allocation is a zero vector, algorithm concludes; indicating the existence of no feasible solutions.

In a nutshell, the disclosed invention proposes a highly flexible and efficient scheduling method and system executing the same method for machine-to-machine (M2M) communication(s), offering a framework for optimally efficient handling of scarce resources for cellular networks. Said framework offers a robust, efficient and convergent solution in organizing network resources compliant with quality-of-service (QoS) requirements dictated thereupon. In a preferred embodiment of the system employing the method taught in disclosed invention; the base station uses semi-persistent scheduling (SPS) to allocate resources to time-triggered machine type devices whose data generations are pre-known, and dynamic scheduling to include event-based machine-to-machine devices. Handling of the newly-arriving devices is processed through a call admission algorithm, including both existing and newly arriving devices and excluding departing devices from a common pool of machines. The schedule is periodically updated depending on various factors such as traffic density and bandwidth usage. If these devices cannot be allocated within the available frequency resources, then the lowest priority devices are dropped.

In one aspect of the present invention, a method of machine-to-machine (M2M) communication scheduling semi-persistently within a cellular network of time-triggered devices, said cellular network comprising at least one base station and multiple instances of machine type communication (MTC) devices is proposed.

In a further aspect of the present invention, said method comprises a minimum frequency first fit allocation sub-method for minimizing resource usage while retaining quality of service requirements.

In a further aspect of the present invention, said method further comprises a first fit occupied bands sub-method for management of call admission and allocation of M2M devices that join the network in cooperation with said minimum frequency first fit allocation sub-method.

In a further aspect of the present invention, said method further comprises a pruning based efficient depth first search sub-method for finding optimal solution(s) for reduction of overall complexity of total enumeration.

In a further aspect of the present invention, said minimum frequency first fit allocation sub-method comprises step of commencement, where allocation of the devices start from the highest priority cluster.

In a further aspect of the present invention, said minimum frequency first fit allocation sub-method comprises step of extra delay calculation, where extraneous delay exerted on each cluster caused by higher priority clusters is calculated.

In a further aspect of the present invention, said minimum frequency first fit allocation sub-method comprises step of remainder delay calculation, where the difference between delay tolerance and experienced delay calculated in previous step is computed to determine the number of devices from cluster at hand that can be allocated in occupied band.

In a further aspect of the present invention, said minimum frequency first fit allocation sub-method comprises step of remainder delay evaluation, where if the calculated number is larger than the number of remaining devices from current cluster, then all remaining devices in cluster are allocated to band; otherwise, the number of remaining devices from current cluster is updated for allocation to following bands.

In a further aspect of the present invention, said minimum frequency first fit allocation sub-method comprises step of termination, where method is stopped when there are no remaining allocated devices from the clusters.

In a further aspect of the present invention, said first fit occupied bands sub-method comprises step of commencement, where newly arriving devices are ordered according to their priorities.

In a further aspect of the present invention, said first fit occupied bands sub-method comprises step of extra delay calculation, where starting from the highest priority cluster, crossDelay, the delay experienced due to newly arriving devices already allocated to band is calculated, including additional delay from all devices that are already assigned.

In a further aspect of the present invention, said first fit occupied bands sub-method comprises step of remainder delay calculation, where remaining delay is computed to determine the number of devices that can be additionally allocated from the corresponding cluster with the same procedure applied in parallel with minimum frequency first fit allocation sub-method.

In a further aspect of the present invention, said first fit occupied bands sub-method comprises step of termination, where outputs are generated including number of unallocated devices after running the algorithm, and updated unit frequency band state.

In a further aspect of the present invention, said outputs generated in said termination step of said first fit occupied bands sub-method are delivered as input to an at least second execution of said minimum frequency first fit allocation sub-method.

In a further aspect of the present invention, said pruning based efficient depth first search sub-method comprises step of initialization, where method initializes the current node (CN) from the root node.

In a further aspect of the present invention, said pruning based efficient depth first search sub-method comprises step of check type one, where method checks if current node is a non-leaf node with unexplored children.

In a further aspect of the present invention, said pruning based efficient depth first search sub-method comprises step of check type two, where method checks if current node satisfies at least one of the pruning conditions.

In a further aspect of the present invention, said pruning based efficient depth first search sub-method comprises step of check type three, where method checks if the current node has descendant(s) at all.

In a further aspect of the present invention, said pruning based efficient depth first search sub-method comprises step of check type four, where method checks if current node complies with the delay bound and provides a better feasible solution than already stored.

In a further aspect of the present invention, said pruning based efficient depth first search sub-method comprises step of feasibility update, where best feasible solution and optimal allocation values are stored.

In a further aspect of the present invention, said pruning based efficient depth first search sub-method comprises step of termination, where execution stops once all nodes are explored and outputs are registered.

In a further aspect of the present invention, said efficient depth first search sub-method further comprises storage and update construct for best feasible solution.

In a further aspect of the present invention, said efficient depth first search sub-method further comprises storage and update construct for optimal band allocation.

In a further aspect of the present invention, said check type one step returns to parent node when condition is satisfied, marking the current node CN explored.

In a further aspect of the present invention, said check type two step returns to parent node when both conditions are satisfied, marking the current node CN and all descendants thereof explored.

In a further aspect of the present invention, said check type three step proceeds with the unexplored child node with minimum band value in the case that current node has descendants.

In a further aspect of the present invention, said check type four step returns to check type one step if current node fails to comply with the delay bound, nor providing a better solution.

In a further aspect of the present invention, said feasibility update step proceeds with update of the best feasible solution and storing the current node in the optimal allocation construct, updates current node with parent node, marking descendant nodes explored and returning thus to next parent node.

In a further aspect of the present invention, said check type one, check type two, check type three and check type four, in addition to feasibility update steps together constitute an exploration meta-step which repeats until no nodes are left unexplored.

In one aspect of the present invention, a system for scheduling of machine-to-machine (M2M) communication semi-persistently within a cellular network of time-triggered device multiplicity utilizing said method is proposed.

What is claimed is:

1. A method of a machine-to-machine communication scheduling semi-persistently within a cellular network of time-triggered devices, wherein the cellular network comprises at least one base station and a plurality of instances of machine type communication devices, and the method comprises:
   a minimum frequency first fit allocation sub-method for minimizing a resource usage while retaining a quality of service requirements, said minimum frequency first fit allocation sub-method comprising the steps of:
      commencement, wherein the allocation of the machine-to-machine devices start from a highest priority cluster,
      extra delay calculation, wherein an extraneous delay exerted on each cluster caused by higher priority clusters is calculated,
      remainder delay calculation, wherein a difference between a delay tolerance and an experienced delay calculated in previous step is computed to determine a number of the machine-to-machine devices from the highest priority cluster at hand allocated in an occupied band,
      remainder delay evaluation, wherein if a calculated number is larger than a number of remaining devices from a current cluster, then the remaining devices in the current cluster are allocated to the occupied band; otherwise, the number of the remaining devices from the current cluster is updated for an allocation to following bands; and,
      termination, wherein the method is stopped when there are no remaining allocated devices from the higher priority clusters,
   a first fit occupied bands sub-method for a management of a call admission and an allocation of machine-to-machine devices joining a network in cooperation with the minimum frequency first fit allocation sub-method; and,
   a pruning based efficient depth first search sub-method for finding an optimal solution for a reduction of an overall complexity of a total enumeration.

2. The method according to claim 1, wherein the first fit occupied bands sub-method comprising the steps of:
   commencement, wherein newly arriving devices are ordered according to priorities of the newly arriving devices;
   extra delay calculation, wherein starting from a highest priority cluster, a cross delay, a delay experienced due to the machine-to-machine devices already allocated to a band is calculated, comprising an additional delay from the machine-to-machine devices already assigned;
   remainder delay calculation, wherein a remaining delay is computed to determine a number of the machine-to-machine devices additionally allocated from a corresponding cluster with a same procedure applied in parallel with the minimum frequency first fit allocation sub-method; and,
   termination, wherein outputs are generated and comprises a number of unallocated devices after running an algorithm, and an updated unit frequency band state.

3. The method according to claim 2, wherein the outputs generated in the step of termination of the first fit occupied bands sub-method are delivered as an input to an at least second execution of the minimum frequency first fit allocation sub-method.

4. The method according to claim 1, wherein the pruning based efficient depth first search sub-method comprising the steps of:
   initialization, wherein the method initializes a current node from a root node,
   check type one, wherein the method checks if the current node is a non-leaf node with an unexplored children,
   check type two, wherein the method checks if the current node satisfies at least one of pruning conditions,
   check type three, wherein the method checks if the current node has descendants,
   check type four, wherein the method checks if the current node complies with a delay bound and provides a better feasible solution than already stored,
   feasibility update, wherein a best feasible solution and optimal allocation values are stored; and,
   termination, wherein execution stops once all nodes are explored and outputs are registered.

5. The method according to claim 4, wherein the pruning based efficient depth first search sub-method further comprises a storage and update scheme for the best feasible solution.

6. The method according to claim 4, wherein the pruning based efficient depth first search sub-method further comprises a storage and update scheme for an optimal band allocation.

7. The method according to claim 4, wherein the step of check type one returns to a parent node when a condition is satisfied, marking the current node explored.

8. The method according to claim 4, wherein the step of check type two returns to a parent node when both conditions are satisfied, marking the current node and the descendants of the current node explored.

9. The method according to claim 4, wherein the step of check type three proceeds with an unexplored child node with a minimum band value in a case that the current node has the descendants.

10. The method according to claim 4, wherein the step of check type four returns to the step of check type one if the current node fails to comply with the delay bound, nor providing a better solution.

11. The method according to claim 4, wherein the step of feasibility update proceeds with an update of the best feasible solution and storing the current node in an optimal allocation scheme, updates the current node with a parent node, marking the current node and the descendants of the current node explored and returning to a next parent node.

12. The method according to claim 4, wherein the steps of check type one, check type two, check type three and check type four, and feasibility update constitute an exploration meta-step, wherein the exploration meta-step repeats until no nodes are left unexplored.

13. A system for scheduling machine-to-machine communications semi-persistently within a cellular network of a time-triggered device, wherein the system utilizes the method according to claim 1.

14. The system according to claim 13, wherein the minimum frequency first fit allocation sub-method comprising the steps of:
commencement, wherein the allocation of the machine-to-machine devices start from a highest priority cluster,
extra delay calculation, wherein an extraneous delay exerted on each cluster caused by higher priority clusters is calculated,
remainder delay calculation, wherein a difference between a delay tolerance and an experienced delay calculated in previous step is computed to determine a number of the machine-to-machine devices from the highest priority cluster at hand allocated in an occupied band, remainder delay evaluation, wherein if a calculated number is larger than a number of remaining devices from a current cluster, then the remaining devices in the current cluster are allocated to the occupied band; otherwise, the number of the remaining devices from the current cluster is updated for an allocation to following bands; and,
termination, wherein the method is stopped when there are no remaining allocated devices from the higher priority clusters.

15. The system according to claim 13, wherein the first fit occupied bands sub-method comprising the steps of:
commencement, wherein newly arriving devices are ordered according to priorities of the newly arriving devices;
extra delay calculation, wherein starting from a highest priority cluster, a cross delay, a delay experienced due to the machine-to-machine devices already allocated to a band is calculated, comprising an additional delay from the machine-to-machine devices already assigned;
remainder delay calculation, wherein a remaining delay is computed to determine a number of the machine-to-machine devices additionally allocated from a corresponding cluster with a same procedure applied in parallel with the minimum frequency first fit allocation sub-method; and,
termination, wherein outputs are generated and comprises a number of unallocated devices after running an algorithm, and an updated unit frequency band state.

16. The system according to claim 15, wherein the outputs generated in the step of termination of the first fit occupied bands sub-method are delivered as an input to an at least second execution of the minimum frequency first fit allocation sub-method.

17. The system according to claim 13, wherein the pruning based efficient depth first search sub-method comprising the steps of:
initialization, wherein the method initializes a current node from a root node,
check type one, wherein the method checks if the current node is a non-leaf node with an unexplored children,
check type two, wherein the method checks if the current node satisfies at least one of pruning conditions,
check type three, wherein the method checks if the current node has descendant,
check type four, wherein the method checks if the current node complies with a delay bound and provides a better feasible solution than already stored,
feasibility update, wherein a best feasible solution and optimal allocation values are stored; and,
termination, wherein execution stops once all nodes are explored and outputs are registered.

18. The system according to claim 17, wherein the pruning based efficient depth first search sub-method further comprises a storage and update scheme for the best feasible solution.

19. The system according to claim 17, wherein the pruning based efficient depth first search sub-method further comprises a storage and update scheme for an optimal band allocation.

* * * * *